United States Patent
Huo et al.

(10) Patent No.: US 8,073,231 B2
(45) Date of Patent: Dec. 6, 2011

(54) TUBE DETECTION IN DIAGNOSTIC IMAGES

(75) Inventors: Zhimin Huo, Pittsford, NY (US); Shoupu Chen, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 635 days.

(21) Appl. No.: 12/255,830

(22) Filed: Oct. 22, 2008

(65) Prior Publication Data
US 2010/0098314 A1   Apr. 22, 2010

(51) Int. Cl.
*G06K 9/00* (2006.01)
(52) U.S. Cl. ...................................... 382/132
(58) Field of Classification Search .......... 382/128–132; 600/437
See application file for complete search history.

(56) References Cited

U.S. PATENT DOCUMENTS

| | | |
|---|---|---|
| 2003/0053697 A1* | 3/2003 | Aylward et al. ............... 382/203 |
| 2003/0135115 A1* | 7/2003 | Burdette et al. .............. 600/437 |
| 2004/0109594 A1* | 6/2004 | Luo et al. ...................... 382/132 |

OTHER PUBLICATIONS

Commonly assigned U.S. Appl. No. 11/644,858 entitled "Computer-Aided Tube and Tip Detection" by Huo et al. (filed Dec. 22, 2006).
Commonly assigned U.S. Appl. No. 11/942,021 and entitled "Image Analysis of Tube Tip Positioning" by Huo et al. (filed Nov. 19, 2007).
Commonly assigned U.S. Appl. No. 12/172,283 entitled "Computer-Aided Tubing Detection" by Huo et al. (filed Jul. 14, 2008).
Commonly assigned U.S. Appl. No. 12/058,803 entitled "Linear Structure Verification for Medical Imaging Applications" to Chen (Mar. 31, 2008).

* cited by examiner

Primary Examiner — Irakli Kiknadze

(57) ABSTRACT

A method for detecting tubing in a radiographic image of a patient, executed at least in part by a control logic processor, obtains radiographic image data for a patient and identifies a region of interest in the radiographic image. A gradient magnitude image of the region of interest is formed and analyzed to identify one or more linear features by defining a band lying substantially within the region of interest and having a center point and repeating a sequence with two or more iterations of assigning a rotation angle for the rotatable band about the center point and computing the ensemble average of gradient magnitude values along each of a plurality of lines extending within the rotatable band at the defined rotation angle, then computing relative magnitudes for the lines. The one or more identified linear features are evaluated according to the results of the ensemble average computing.

12 Claims, 15 Drawing Sheets

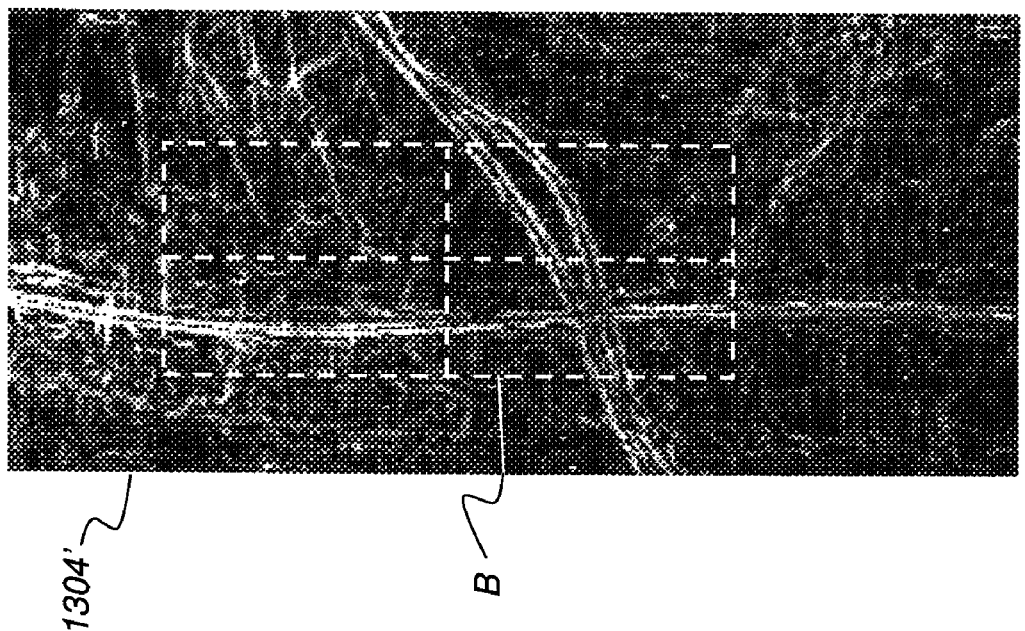

TUBE DETECTION IN DIAGNOSTIC IMAGES

FIELD OF THE INVENTION

This invention generally relates to processing of diagnostic images and more particularly to processing that is performed in order to identify the position of an internal tube positioned within the patient.

BACKGROUND OF THE INVENTION

Portable X-ray radiographs are used in the Intensive Care Unit (ICU) for indicating significant or unexpected conditions requiring immediate changes in patient management. A single diagnostic image may show a condition that is related to treatment procedures, such as a collapsed lung or the proper or improper placement of tubing within the patient. A succession of diagnostic images, taken over a time period, may help to show the progress of a patient's condition and help to direct ICU treatment accordingly.

While portable radiography has advantages for ready accessibility, however, there are some difficulties that limit the accuracy and usefulness of diagnostic images obtained in the ICU. Differences in image quality from one image to the next can be significant, owing to differences in exposure settings, patient and apparatus positioning, scattering, and grid application. Even for successive images obtained from the same patient over a short treatment period, there can be substantial image quality differences between two or more images that complicate or even prevent effective comparison between them. This can constrain the ability of the clinician to detect subtle changes that can be highly significant.

One concern for patient care management relates to the ability to detect the proper positioning of tubing that has been inserted into the patient. This tubing includes, for example, endotracheal (ET) tubes, feeding tubes (FTs), and nasogastric tubes (NGTs), among others. Proper tube positioning can help to ensure delivery or disposal of liquids and air/gases to and from the patient during treatment. Improper tube positioning, on the other hand, can cause patient discomfort, can render a treatment ineffective, or can even be life-threatening.

In particular, because of poor image quality in portable anterior-posterior (AP) X-ray images, it is often difficult for a clinician to visually detect, with sufficient certainty, the position of the tube tip. Thus, there is a need for a diagnostic imaging method that helps to identify tubing and tube tip position.

SUMMARY OF THE INVENTION

It is an object of the present invention to address the need for improvements in automatic detection of tubing and tube tips. With this object in mind, the present invention provides a method for detecting tubing in a radiographic image of a patient, executed at least in part by a control logic processor, comprising: obtaining radiographic image data for a patient; identifying a region of interest in the radiographic image; forming a gradient magnitude image of the region of interest; analyzing the gradient magnitude image to identify one or more linear features by defining a band lying substantially within the region of interest and having a center point and repeating a sequence comprising two or more iterations of: (i) assigning a rotation angle for the rotatable band about the center point; and (ii) computing the ensemble average of gradient magnitude values along each of a plurality of lines extending within the rotatable band at the defined rotation angle and computing relative magnitudes for the lines; and evaluating the one or more identified linear features according to the results of the ensemble average computing.

It is a feature of the present invention that it uses gradient magnitude data formed from the image and analyzed at a plurality of angles until a characteristic pattern is detected at one of the plurality of angles.

It is an advantage of the present invention it adapts to different imaging apparatus and equipment, so that images taken at different times or on different imaging systems can be processed and compared.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 4C shows an example of a rotatable band positioned within the magnitude gradient image of FIG. 4B.

DETAILED DESCRIPTION OF THE INVENTION

It is to be understood that elements not specifically shown or described may take various forms well known to those skilled in the art.

Reference is made to commonly assigned U.S. patent application Ser. No. 11/644,858 entitled "COMPUTER-AIDED TUBE AND TIP DETECTION" by Huo et al., incorporated herein by reference.

Reference is made commonly assigned U.S. patent application Ser. No. 11/942,021 and entitled "IMAGE ANALYSIS OF TUBE TIP POSITIONING" by Huo et al., incorporated herein by reference.

Reference is made to commonly assigned U.S. patent application Ser. No. 12/172,283 entitled "COMPUTER-AIDED TUBING DETECTION" by Huo et al., incorporated herein by reference.

Reference is made to commonly assigned U.S. patent application Ser. No. 12/058,803 entitled "LINEAR STRUCTURE VERIFICATION FOR MEDICAL IMAGING APPLICATIONS" to Chen, incorporated herein by reference.

The present invention provides a method for automated detection of features such as tubing and tube tips from a radiographic image of a patient. The method of the present invention is executed, at least in part, by a control logic processor, such as a computer, microprocessor, or other dedicated logic processing apparatus that has a processor-accessible memory for executing programmed instructions and storing radiographic image data, and that is associated with a display apparatus for display of a processed image having detected tubing. The method detects an initial set of one or more possible tube segments using a rotatable band analysis technique that selects a band angle, searches for patterns along one or more lines lying within the band, and determines the presence of a tubing structure according to the pattern detected.

In the description that follows, the method of the present invention is directed to detection and display of the ET tube and tip. Thus, for example, specific anatomy important for ET positioning is noted. However, it should be observed that similar steps, with appropriate anatomy used for reference, would apply for detection of other features, such as for detection of other types of tubing.

It should be noted that ET tubing is typically fabricated to have a radio-opaque strip that makes it easier to identify in the radiographic image. References in the following description to left and right "edge" refer to detection of the edge of the corresponding line that is generated from this radio-opaque strip, rather than to detection of the physical edge of the tubing itself.

Figure 1:
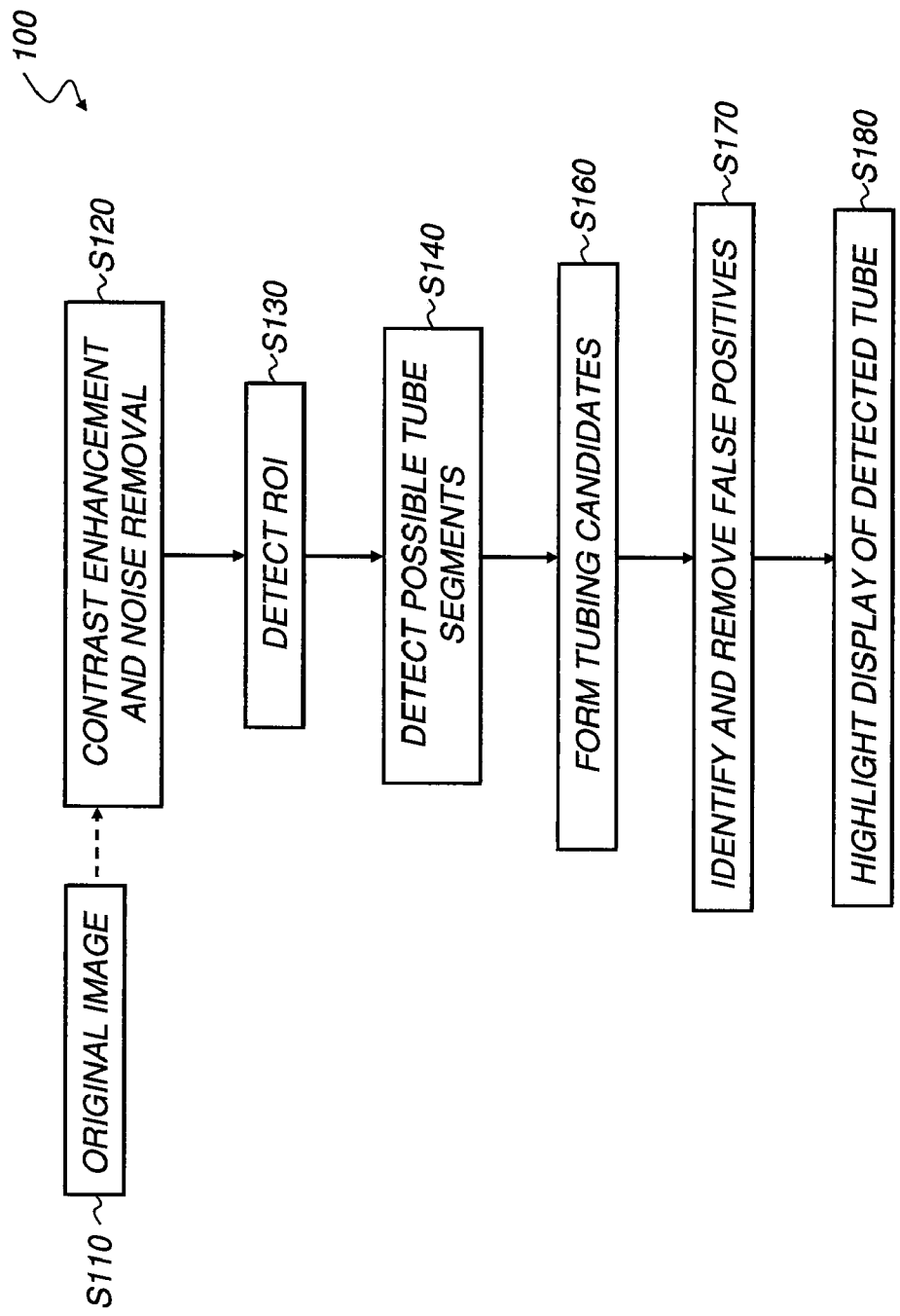
FIG. 1 is a logic flow diagram showing a basic sequence for tube and tip detection in embodiments of the present invention.

FIG. 1 is a flow diagram of a detection method 100 showing a basic sequence for tube and tip detection in embodiments of the present invention. In an obtain image step S110, the diagnostic image data for the patient is obtained, such as from a digital radiography (DR or CR) system or from a scanner, for example. An optional image processing step S120 can be helpful for performing any necessary cleanup and noise removal that might be helpful. This processing can include any suitable method for pre-processing of the image data, including histogram equalization to enhance the contrast of the grayscale image by transforming values using Contrast-Limited Adaptive Histogram Equalization (CLAHE), described in more detail in U.S. patent application Ser. No. 11/644,858 and entitled "Computer-Aided Tube and Tip Detection" by Huo et al.

An ROI detection step S130 follows, in which key anatomical structures within the Region Of Interest (ROI) for the tubing type are identified. This step helps to reduce computation time by isolating the area of the image most likely to include the tubing of interest. In one embodiment for ET tube detection, ROI detection step S130 identifies the lung and spine regions, since the image of the ET tube is usually centered about the spine. The tip of the ET tube is generally about 3-5 cm above the carina, located between the two primary bronchi at the site of the tracheal bifurcation.

Figure 2A:
FIG. 2A shows an example of an x-ray image obtained on a portable radiography system.
Figure 2B:
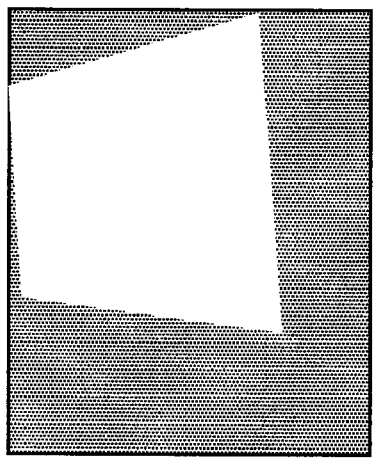
FIG. 2B is an image of a mask used for locating lung structures.
Figure 2C:
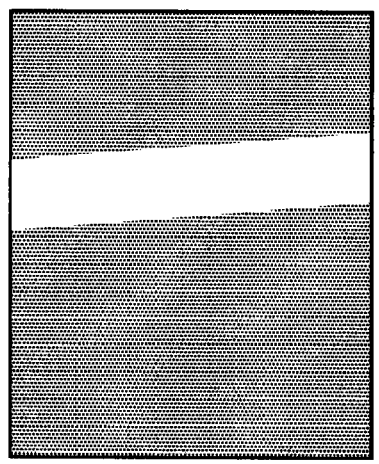
FIG. 2C is an image of a mask used for locating spine structure.

By way of example, FIG. 2A shows a chest x-ray obtained at a portable radiographic imaging system. FIG. 2B shows a mask, here a simple polygon, that is used to coarsely identify the lung area. FIG. 2C then shows a mask that is used to further isolate the spinal chord. The combination of these masks can then be used to help locate the ROI. The position and size of the ROI depend on factors such as the scale of the image and position of the imaged anatomical structures.

The rotating bands method of image processing that is used in the present invention can also be used for detecting the ROI in ROI detection step S130. That is, embodiments of the rotating band image analysis method can be employed for locating, or verifying the location of, an ROI in the obtained diagnostic image. The same basic operation described subsequently for generating feature images for tubing detection would also provide a useful utility for detecting a landmark anatomical structure that is at least substantially linear, such as the spine, prior to tubing detection, for example. This alternative use of the rotating bands method of image analysis is described in more detail subsequently.

Tube Segment Detection

Figure 3:
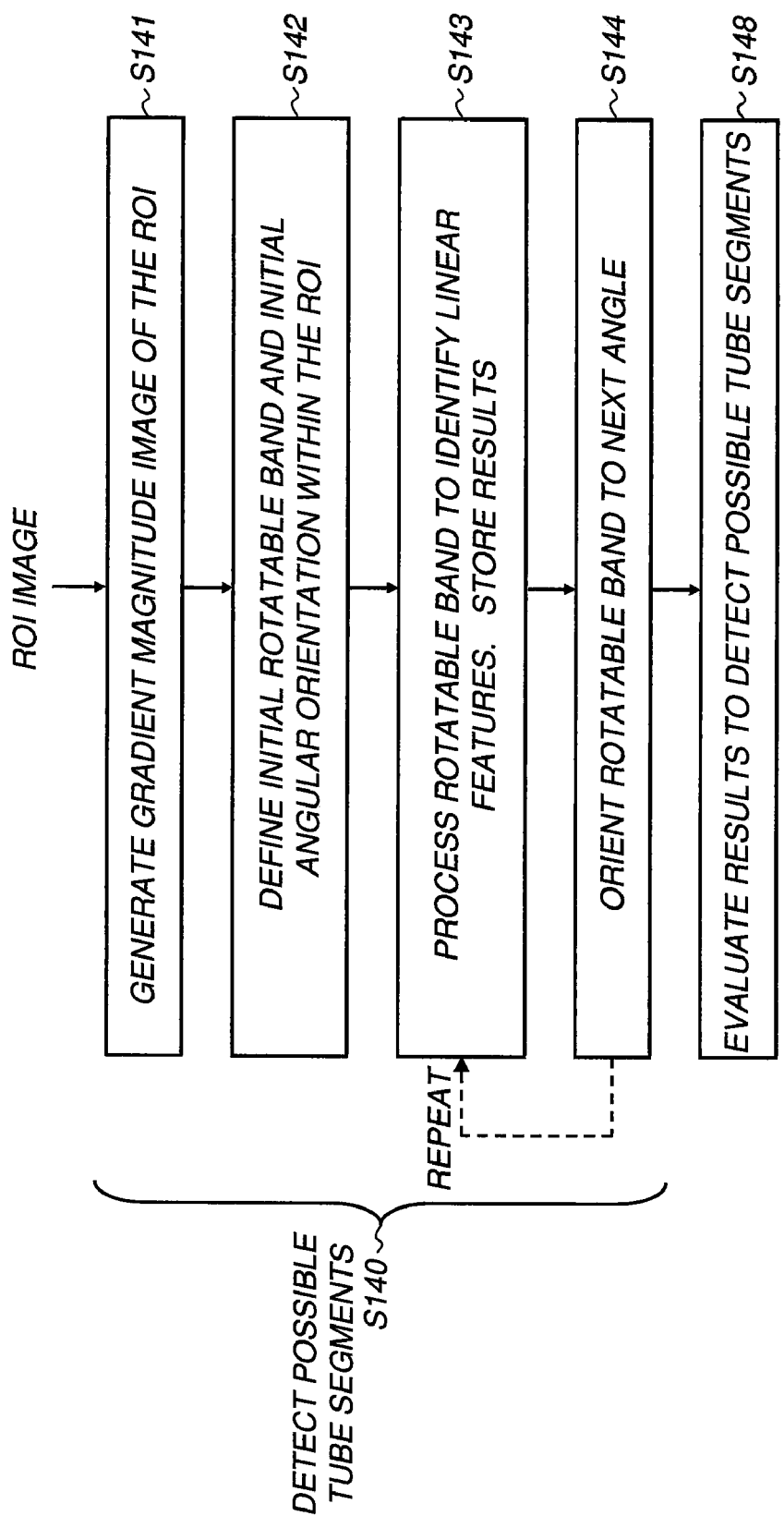
FIG. 3 is a logic flow diagram showing a process for detecting possible tube segments in an embodiment of the present invention.
Figure 4B:
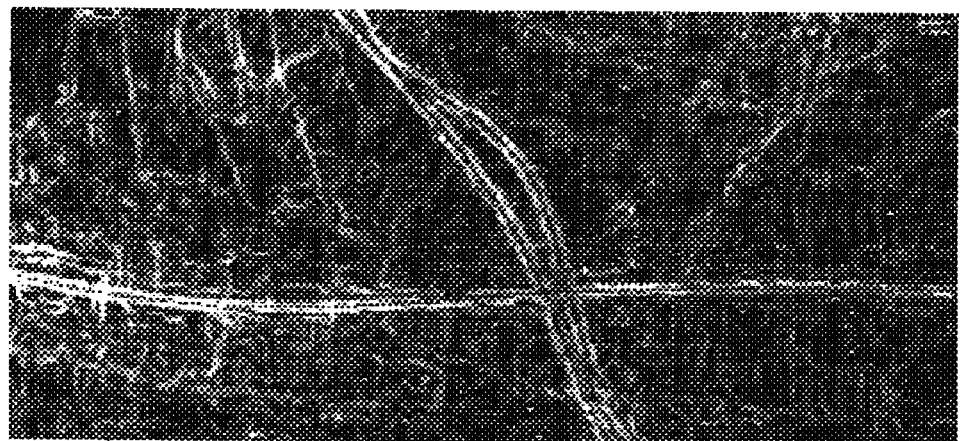
FIG. 4B is a magnitude gradient image of the ROI of FIG. 4A.
Figure 4A:
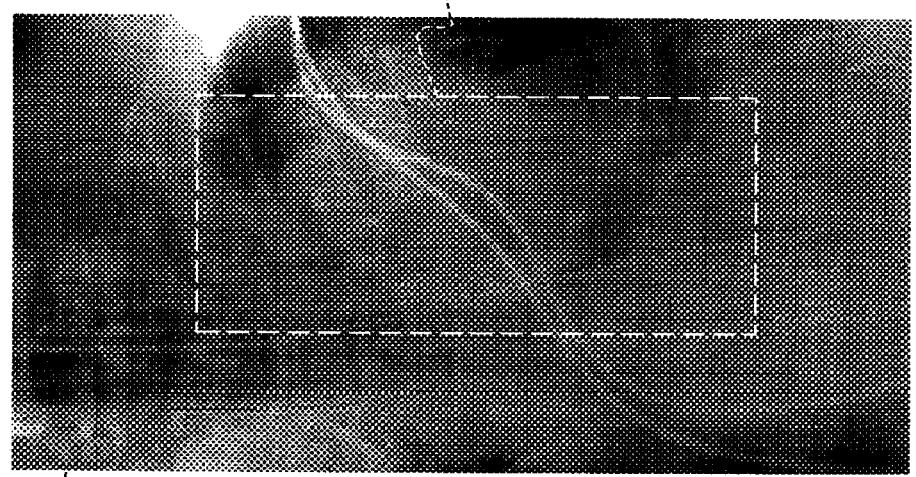
FIG. 4A shows a portion of an x-ray image with an ROI within which there are tubular structures that are difficult to identify.

In an embodiment of the present invention, a detect possible tube segments step S140 is executed on the ROI or on some portion or all of the full image (FIG. 1). The logic flow diagram of FIG. 3 shows a sequence of steps used for tube segment detection in one embodiment. In a gradient magnitude image generation step S141, a gradient magnitude image is generated for the ROI. The gradient magnitude image has a number of advantages over other types of processed image. Gradient direction (or +/− slope orientation) is ignored with this type of image; only the magnitude (or absolute value) of the gradient is used. The gradient magnitude of a digital image is a function of image contrast and is, therefore, intensity-invariant. A linear object such as a section of tube generally produces a higher code value than its background in a digital image and is, therefore, more pronounced in the gradient magnitude image. For example, FIG. 4A shows an x-ray image 1302 with an ROI 1304, shown in dashed outline, that includes a section of tubing. FIG. 4B then shows a magnitude gradient image 1304' that is generated from ROI 1304, with pronounced tubing structures.

Referring again to the flow chart of FIG. 3, a rotatable band definition step S142 defines and positions a rotatable band within the ROI. FIG. 4C shows an example of a rotatable band B positioned within magnitude gradient image 1304'.

Figure 5A:
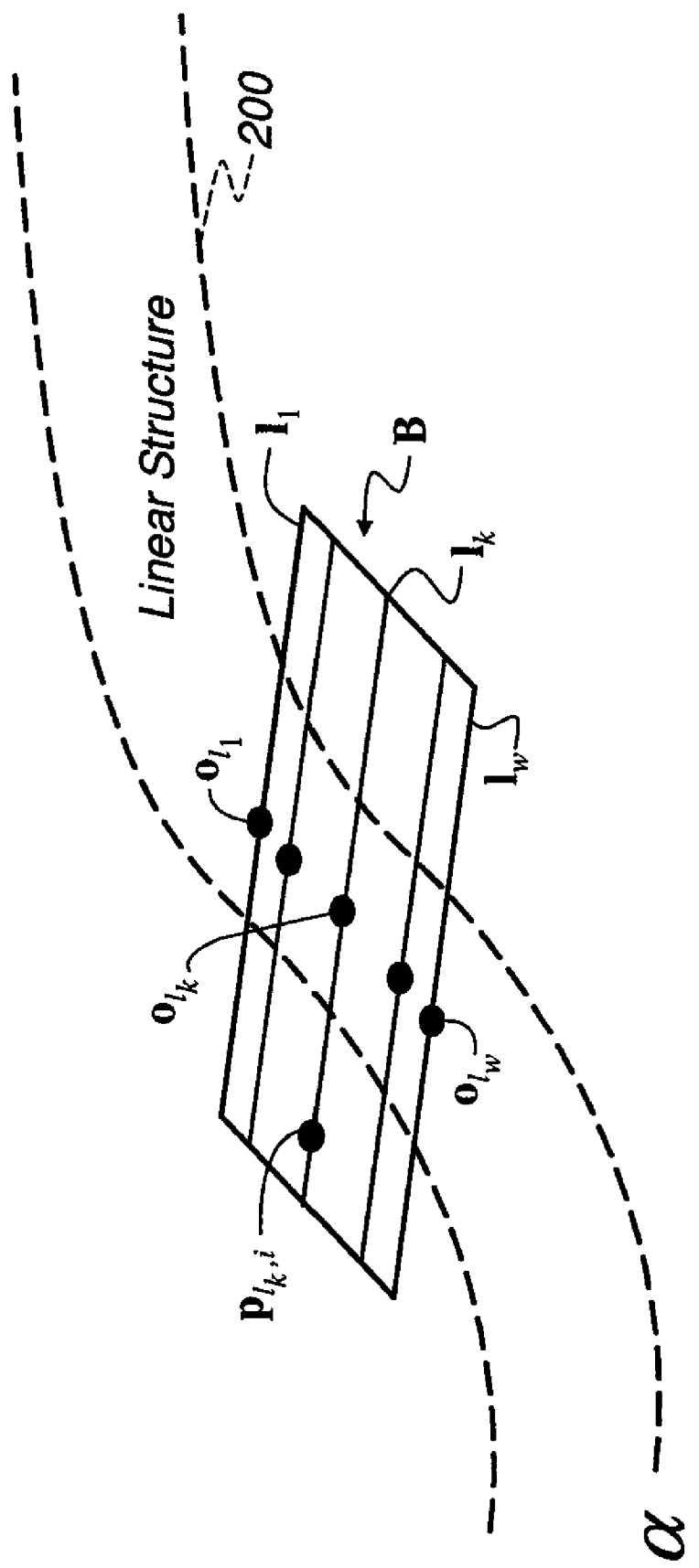
FIG. 5A shows a rotatable band used to identify a linear structure using multiple lines within the band.
Figure 5B:
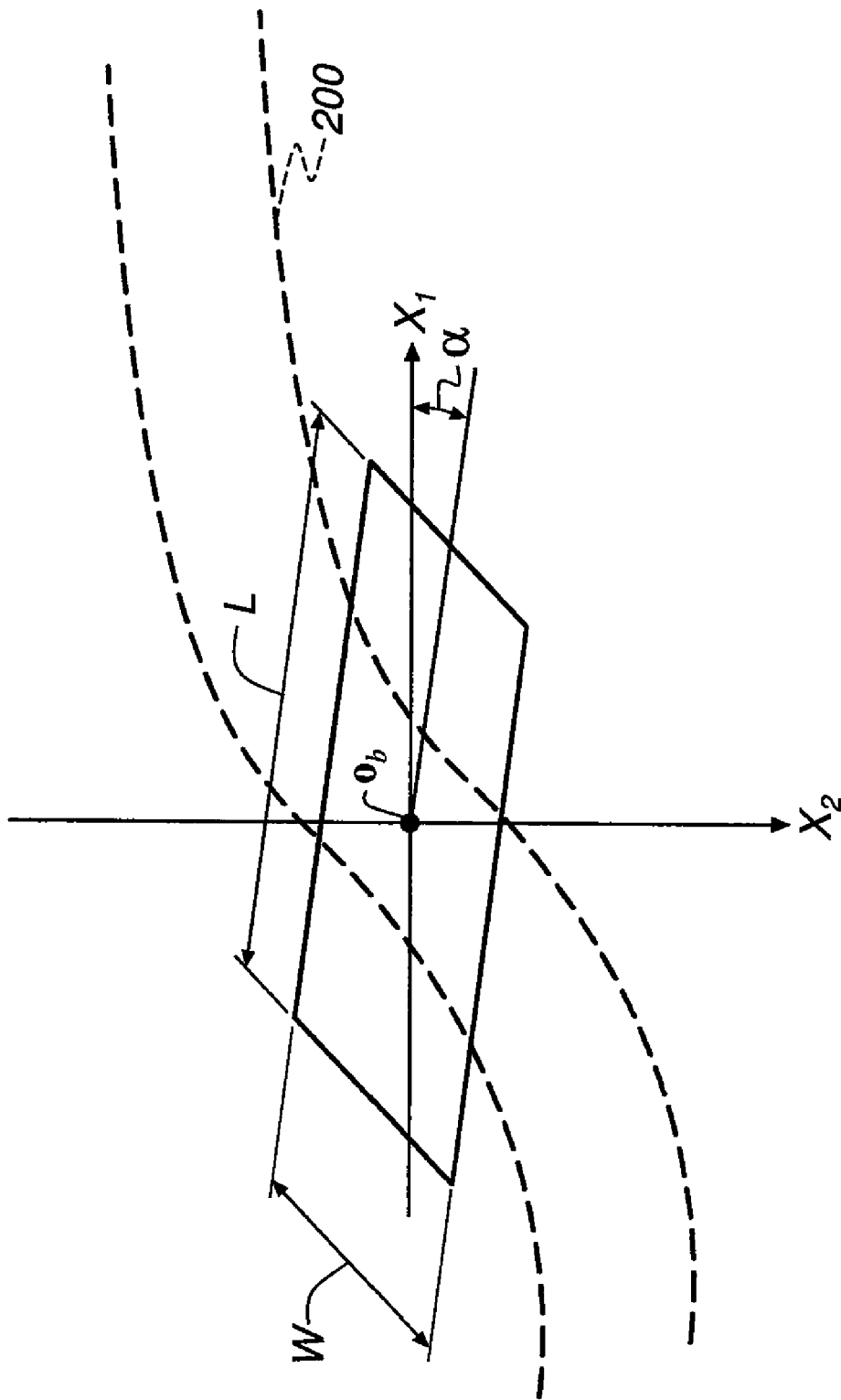
FIG. 5B shows a rotatable band at a rotation angle relative to standard coordinates.

Rotatable band B serves as a guide for detecting tubing and other linear structures from the magnitude gradient image. FIGS. 5A and 5B show how this mechanism operates for detection of a tube segment 200 in one embodiment. The band center point $o_b$ is defined as the origin of a local coordinate system $(X_1, X_2)$ (as shown in FIG. 5B) whose axes are parallel to the image coordinate system axes (wherein the axes align with rows and columns of pixels, respectively). Angle a then determines the band orientation about the center point with respect to the local coordinate system.

Denote the rotatable band by $B(\alpha)$ that contains W lines $I_k(\alpha)$:

$$B(\alpha)=\{I_k(\alpha)\}, k\in[1,\ldots,W] \quad (1)$$

Denote the line center of line $I_k(\alpha)$ through the center of band B as $o_{I_k}$. Denote a pixel on line $I_k(\alpha)$ by $p_{I_k,i}(\alpha)$. Line $I_k$ is a collection of pixels, expressed as: $I_k=\{I(p_{I_k,i}(\alpha))\}$, $i\in[-(L-1)/2, \ldots, (L-1)/2]$ wherein L is the line length. Here, $I=|\nabla I|$ is the gradient magnitude image (gROI) of the intensity image (ROI) denoted by I. As can be seen from the graph displayed in FIG. 5B, the band B, when at angle α, is in a position where lines $I_k$ are approximately perpendicular to the medial axis of the linear structure. For notational simplicity, angular parameter α is omitted in some of the expressions in the following description.

Denote an ensemble average of the set of lines $\{I_k\}$ in the band by $s(\alpha)$ with elements $s_i(\alpha):s(\alpha)=\{s_i(\alpha)\}$, where $$s_i = \frac{1}{W}\sum_{k=1}^{W} \hat{I}(p_{l_k,i}) \quad (2)$$

Referring back to FIG. 5A, the pixel coordinate $p_{I_k,i}$ can be computed as $p_{I_k,i}=if_l+o_{l_k}$; where the centers $o_{l_k}$ are obtained using:

$$o_{l_k} = kf_b + o_b; k \in [-(W-1)/2, \ldots, (W-1)/2;]$$

$$o_b = \begin{bmatrix} o_b^{x1} \\ o_b^{x2} \end{bmatrix}; f_b = \begin{bmatrix} f_b^{x1} \\ f_b^{x2} \end{bmatrix} = \begin{bmatrix} \sin(\alpha) \\ \cos(\alpha) \end{bmatrix};$$

$$o_{l_k} = \begin{bmatrix} o_{l_k}^{x1} \\ o_{l_k}^{x2} \end{bmatrix}; f_l = \begin{bmatrix} f_l^{x1} \\ f_l^{x2} \end{bmatrix} = \begin{bmatrix} \cos(\alpha) \\ \sin(\alpha) \end{bmatrix}.$$

Notably, bands B(α) at different angles are not extracted through the conventional method of interpolation but through a simple sampling procedure that is quite adequate for the present application.

Various features can be generated from processing band B at each of a set of different angles. One feature of particular interest is a maximum relative magnitude of the ensemble average curves. The relative magnitude of the ensemble average curve of a set of lines in the band at a particular angle α is simply defined as $$\Psi(\alpha) = \max(s(\alpha)) - \min(s(\alpha)) = \max_i(s_i) - \min_i(s_i).$$

In practice, angle α is chosen at a few discrete orientations, notationally $[1 \ldots N_\alpha]$. Therefore, the relative magnitude of the ensemble average curve can be expressed as $\Psi(\alpha_j)=\max(s(\alpha_j))-\min(s(\alpha_j)); j\in[1,\ldots,N_\alpha]$.

This can be further simplified as:

$$\Psi_j = \max(s_j) - \min(s_j); j\in[1,\ldots,N_\alpha].$$

The maximum relative magnitude of the ensemble average curve is then obtained as $$\Psi = \max_j(\Psi_j). \quad (3)$$

Accordingly, band $B_j$ that produces maximum relative magnitude is denoted by $B_\Psi$.

Given the relative magnitude of the ensemble average curve, another feature, termed ensemble average ratio $\Re$, can be computed as:

$$\Re = \min_j(\Psi_j)/\max_j(\Psi_j). \quad (4)$$

It is noted that if a band is not associated with a linear structure such as a segment of tubing, the ensemble average ratio $\Re$ is close to 1, signifying the relatively 'isotropic' nature of the underlying structure measured by using ensemble averaging. On the other hand, if a band contains (intersects) a linear structure, the ensemble average ratio $\Re$ diverges from 1, signifying the relatively 'anisotropic' nature of the underlying structure.

Figure 6B:
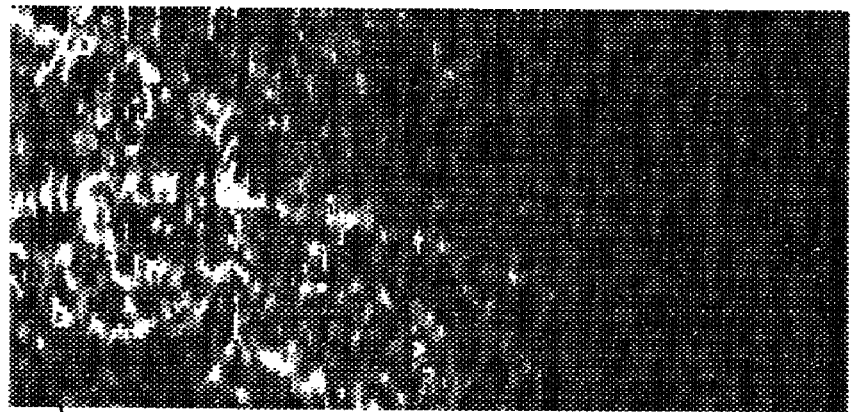
FIG. 6B shows a gradient magnitude image using the method of the present invention.
Figure 6A:
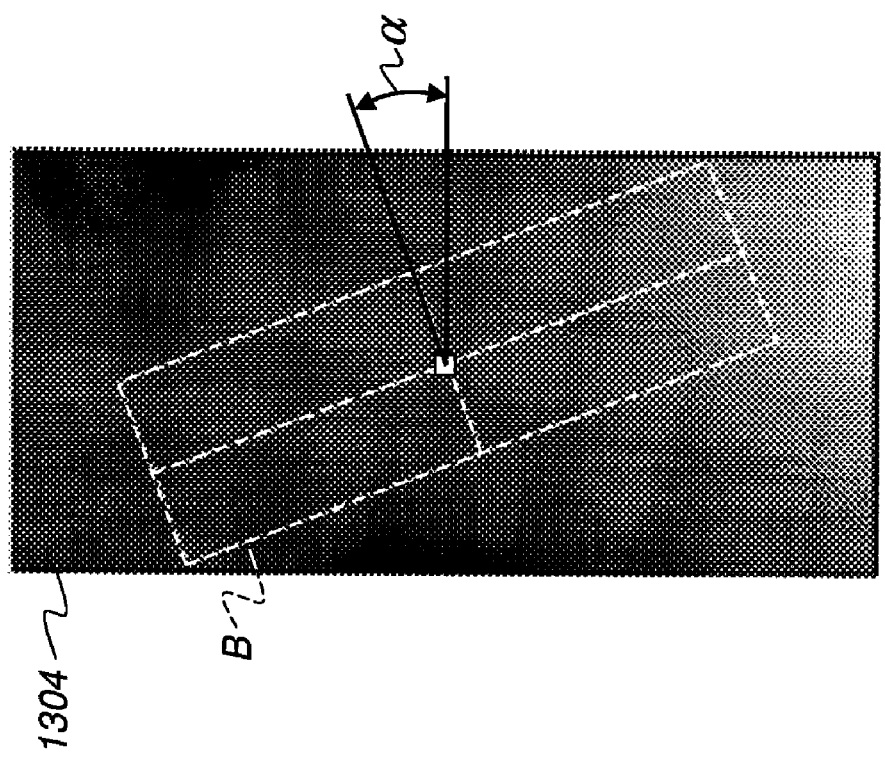
FIG. 6A shows a rotatable band positioned within a region of interest.
Figure 7:
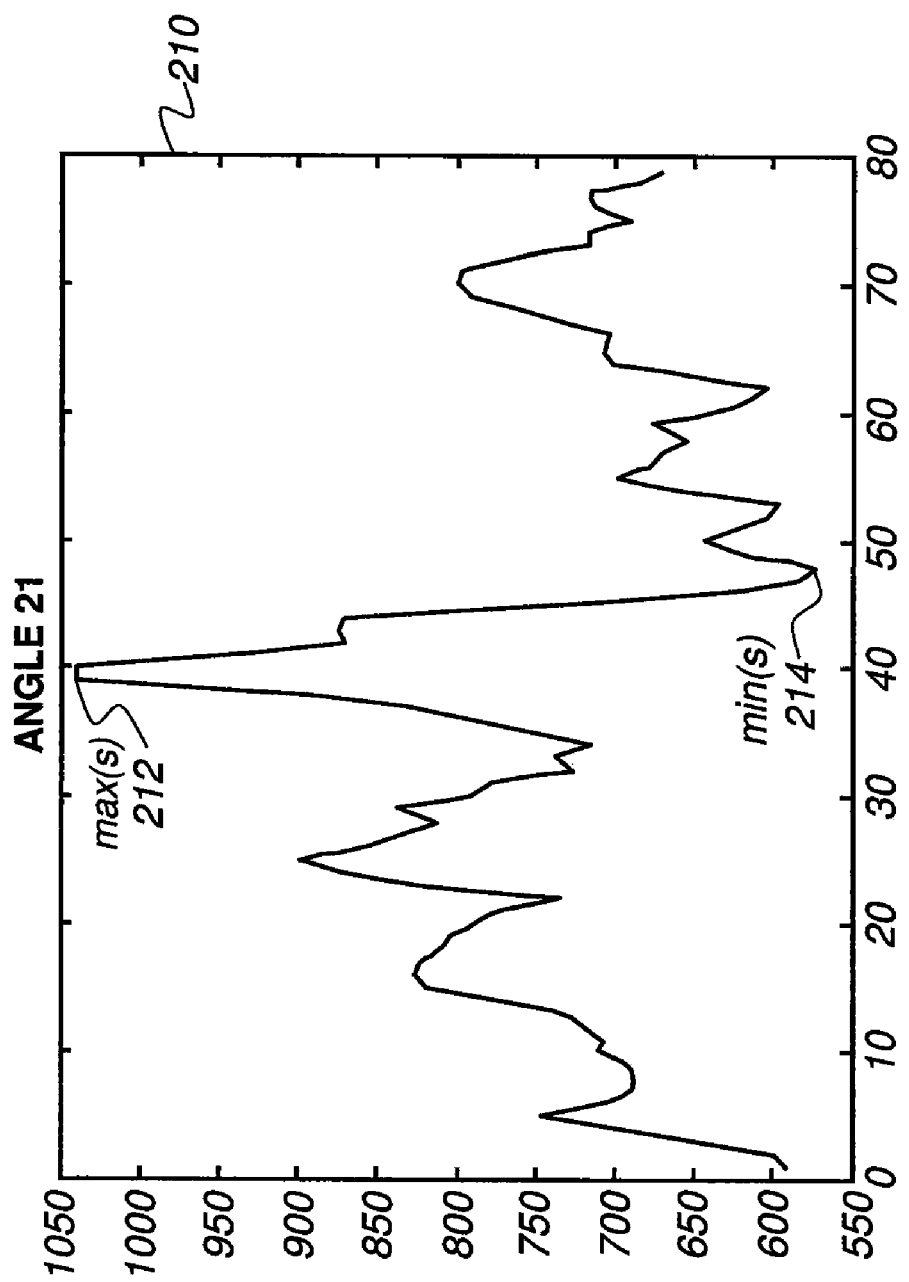
FIG. 7 is a graph showing an exemplary ensemble average curve at one rotation angle.

FIGS. 6A and 6B and the graph of FIG. 7 show an example with a rotatable band B inclined at an angle α of approximately 21 degrees with respect to the image coordinate system. The origin of the coordinate system is selected at the geometric center of the image ROI 1304. The width of band B is chosen as smaller than that of the image ROI 1304. An exemplary width of band B could be one half of that of the image ROI 1304. The geometric center of band B is conveniently aligned with that of image ROI 1304. The exemplary range of angles α could be from 60 degrees to 120 degrees relative to the coordinate system, with exemplary resolution of angle α at one degree.

Referring to FIG. 6B, an image 1504 is the corresponding gradient magnitude image of the portion of the gradient magnitude image gROI of image 1304 that is covered by band B at this angle α. The ensemble average curve, s, of image 1504 is shown by a graph 210 in FIG. 7. The variable max(s) is shown at a point 212 and min(s) is shown at a point 214. The relative magnitude Ψ(α) for this particular curve is max(s)−min(s). A sequence of relative magnitudes Ψ(α) could be obtained by rotating the band about the origin of coordinate system at different discrete angles α. The maximum relative magnitude $$\Psi = \max_j(\Psi_j)$$

and ensemble average ratio for the sequence of relative magnitude Ψ(α) are computed according to Equations 3 and 4 given earlier. The maximum relative magnitude and ensemble average ratio are regarded as the identifiable features of the ensemble average curves of the rotating bands. In an embodiment of the present invention for detecting possible tube segments, the ensemble average ratio $\Re$ serves as a decision maker. If the ensemble average ratio $\Re$ is greater than a predetermined value (e.g. 0.7) then the possibility of the existence of a tube within band B is undetermined. Otherwise, the band angle α corresponding to the maximum relative magnitude indicates the angular position of a possible tube with respect to the coordinate system of the image.

In embodiments of the present invention, if the existence of a tube cannot be determined using the rotatable bands analysis as described earlier, some alternative tube detection algorithm can be used. This could include, for example, use of the centered pattern and gradient templates described in commonly assigned U.S. patent application Ser. No. 12/172,283 cited earlier. Alternately, multiple methods could be applied to the radiographic image data and their results correlated for enhancing accuracy.

Tube Enhancement and Merging to Form Tubing Candidates

Continuing with the sequence of FIG. 1, once possible tube segments are detected, tubing candidates are formed. In a tube enhancement and merging step S160, each possible tube segment detected in step S140 is extended and merged with other candidate segments to form a primary tubing candidate.

Figure 8:
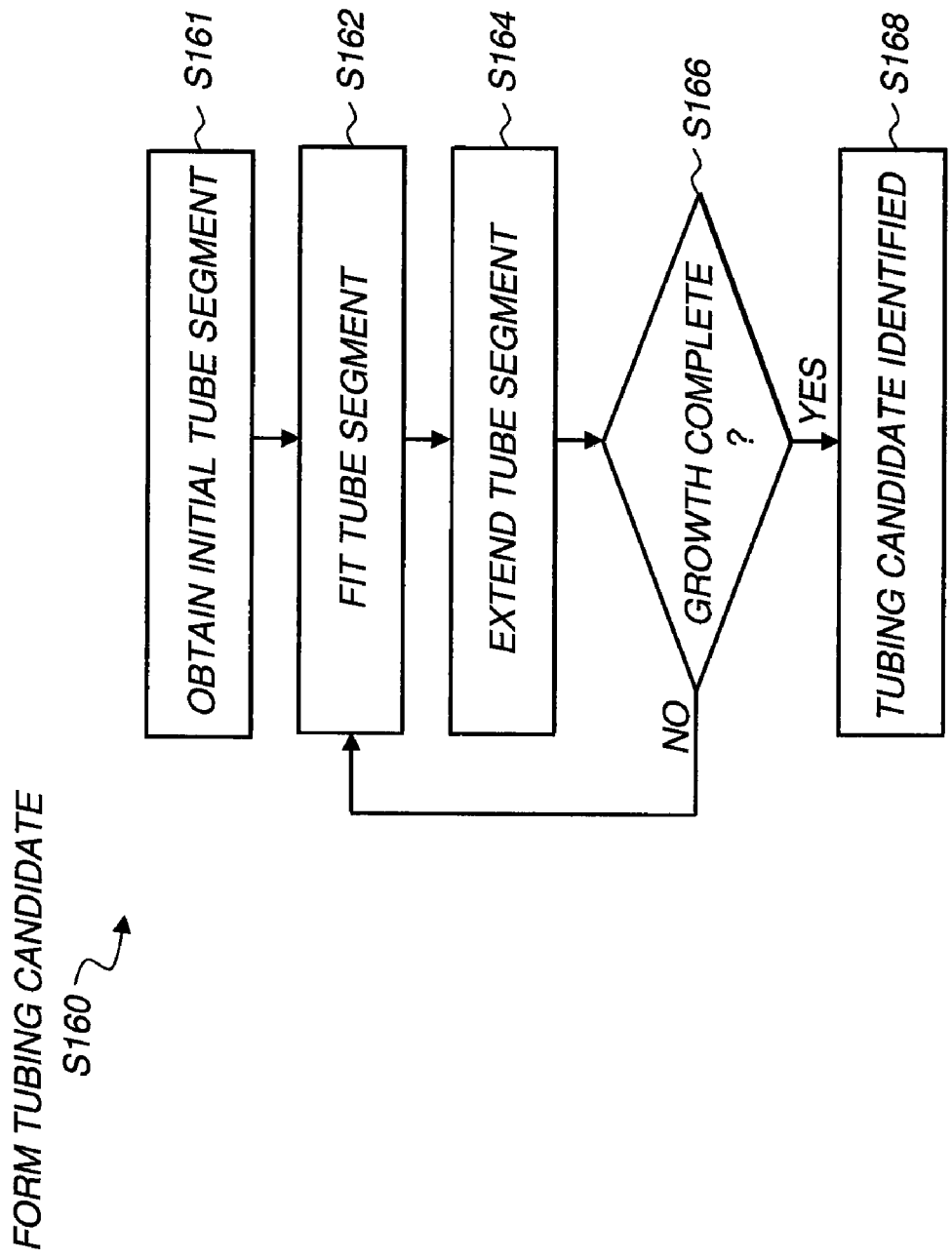
FIG. 8 is a logic flow diagram showing steps for forming a tubing candidate in one embodiment.
Figure 9:
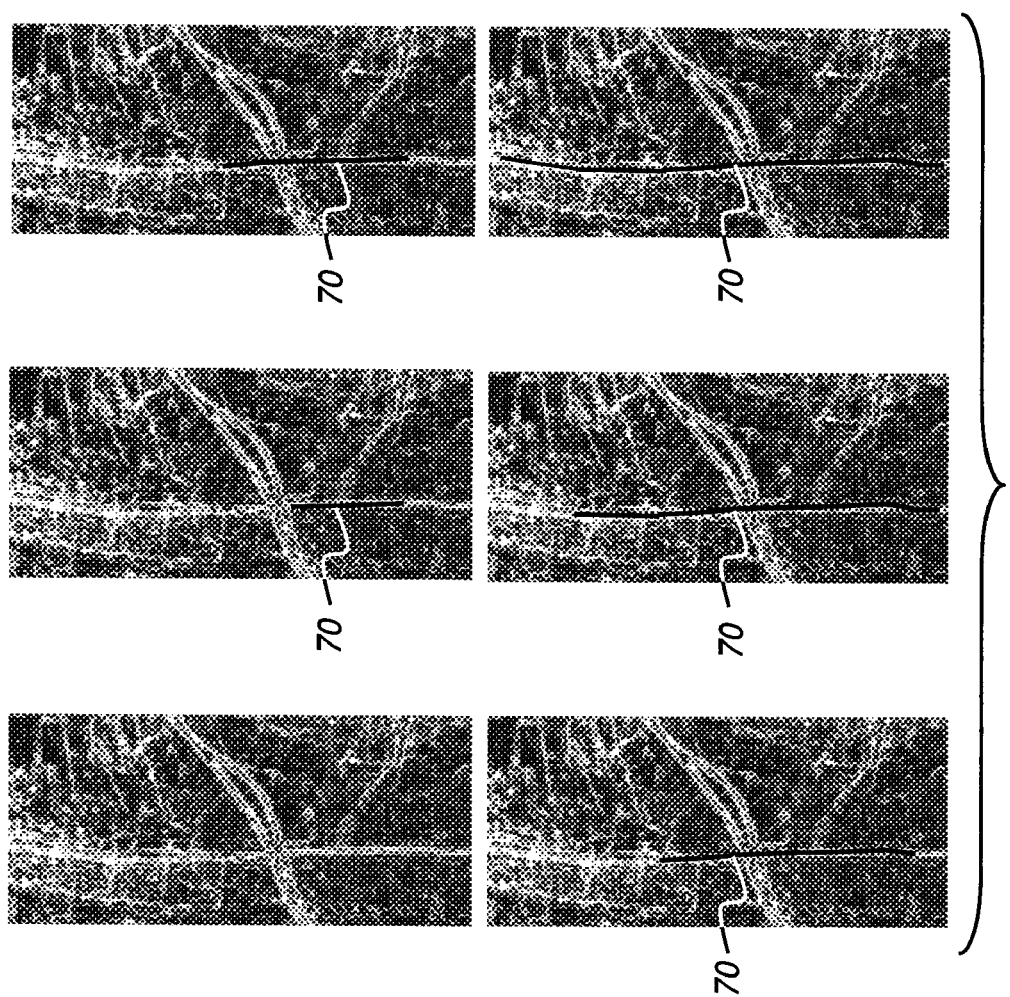
FIG. 9 shows an exemplary sequence for tubing growth.

The logic flow diagram of FIG. 8 lists steps that are used for tube enhancement and merging step S160 in one embodiment. FIG. 9 then shows a series of images showing successive stages for tube enhancement and merging step S160 in ET tube detection for an ROI. In this example, the growth of a tube 70 is shown during different iterations of the tube-growing algorithm.

In one embodiment, tube enhancement involves linear or curve (second and third polynomial) fitting of each detected tube segment for forming a tubing candidate, using methods familiar to those skilled in mathematical curve-fitting techniques. These initial possible tube segments are usually in the form of broken lines or patches. As shown in the sequence of FIG. 9, enhancement starts from both ends of the broken lines, extending along the direction of the fitted line or curve. The tube enhancement algorithm first searches for a predefined number of points along the fitted line or curve at both ends. If a fraction of these points meet a minimum value, these points become part of the initial tube, and another set of points along the fitted line are then examined. The search continues until a new set of points fails to meet the criteria.

In the logic flow of FIG. 8, an initialization step S161 begins by obtaining one of the initial possible tube segments that had been identified in step S140 (FIG. 3). A fitting step 162 is executed in order to fit the possible tube segment to a $3^{rd}$-order polynomial curve. This sequence is carried out as follows in one embodiment:

1) The x,y position of each point in set S is fitted to a $3^{rd}$-order polynomial fitting curve in a fitting step S162.

2) The possible tube segment is extended along this fitting curve in an extension step S164. For this step, the possible tube segment is extended along the fitting curve in increments. In one embodiment, the increment is the lesser of 30 pixels or ⅓ of the identified initial possible tube segment length. The extended point set is labeled E.

3) Check for completion of growth or continue. A test step S166 is then executed in order to determine whether or not growth can continue from the extended tube segment. At the completion of this processing, a termination step S168 is completed.

Merging of tube segments to form a tubing candidate can be performed in a fairly straightforward manner. After fitting two tube segments having overlapping rows of pixels, the mean fitting difference between the two fitting curves is computed. Where this mean value is smaller than an empirically determined constant c, the two tube segments can be merged.

Two nearby tube segments may not have any overlap rows. In such a case, after fitting the two tube segments, if the mean fitting difference in those rows between two tube segments is smaller than an empirically determined constant c, the tube segments can be merged together.

It is instructive to note that the sequence just described for tube enhancement and merging shows one of a number of possible embodiments. Methods that allow incremental growth and continual testing, such as the sequence just described, are advantaged over other possible methods for linking identified possible tube segments to form a tubing candidate.

Feature Extraction for Removing False Positives

Referring again back to the basic flow chart of FIG. 1, a false-positive removal step S170 follows tube enhancement and merging step S160. For each identified tubing candidate, features such as the width, variation in width, length of the detected tubing candidate, and tube position relative to other anatomy structures such as lung and spine are calculated. In addition, statistics from the analysis of the detected tube lines, such as mean curvature, standard deviation, and the variation in curvature of the fitted line can be calculated. In one embodiment, a total of seven features are calculated for each tubing candidate. Tip position and tube width standard deviation can also be used to help detect and eliminate false positive tubing candidates.

Among features that have been found to be particularly useful for ET tube classification are tube width, 1-degree fitting error, 3-degree fitting error, tube/spine angle difference, mean value at tube, tube width and position, and tube percentage in initial regions, that is, percentage of pixels initially determined to be part of a tubing structure. Other features could similarly be extracted and used for false-positive removal. In one embodiment, linear and quadratic discriminant analysis methods (QDA) are employed to analyze these features for differentiating true-positive from false-positive tubing detections.

Figure 10A:
FIGS. 10A, 10B, and 10C show an enhanced original ROI, tube segment detection before classification, and final tubing candidate detections after the classification step (false-positive removal step) for tubing detection as accomplished using an embodiment of the present invention.
Figure 10B:
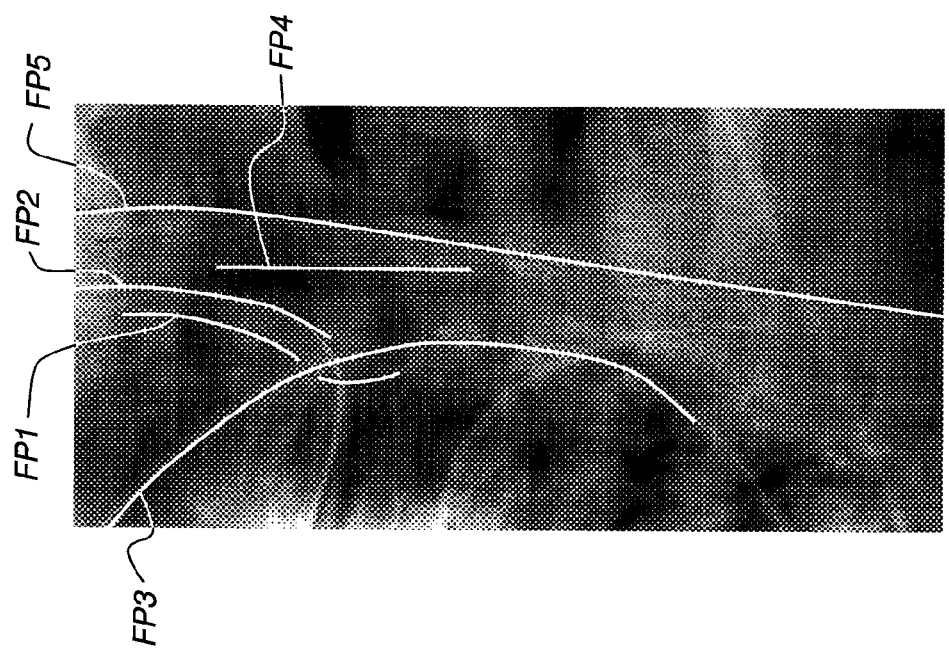
Figure 10C:
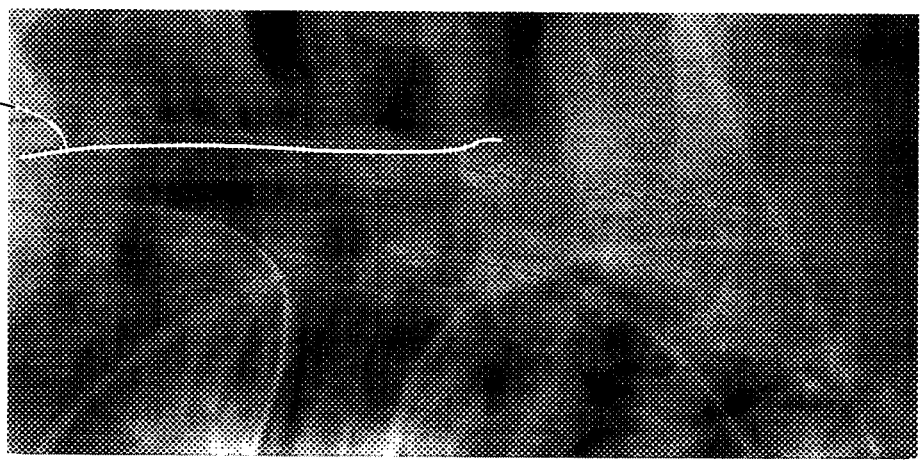

FIGS. 10A through 10C show the original image, results of initial tubing candidate detection, and final results for an ET tube detection sequence in one embodiment of the present invention. In FIG. 10B, a number of false positive tubing candidates can be identified, labeled FP1, FP2, FP3, FP4, and FP5. It can be seen from this example that characteristics such as curvature and overall position can be useful for eliminating a percentage of these false positives. At least significant portions of false positives FP1, FP2, and FP3 are poorly positioned, which can be detected in a straightforward manner using the detectable location of spine and other anatomical structures. Moreover, false positives FP1, FP2, and FP3 also exhibit significant amounts of curvature, more than would be anticipated for ET tubing. False positive FP1 shows variation in curvature, making it a particularly unlikely candidate. False positives FP4 and FP5 have better position and reduced curvature, but fail for other reasons. False positive FP4 appears to be too short and is not connected with other tubing that leads further upward or downward. False positive FP5 has excessive length, extending well past the carina in this example. For these reasons, each of false positives FP1-FP5 can be removed from consideration.

Once false-positive tubing candidates have been identified and discarded, the image of the detected tubing can be highlighted in the display that is presented to the viewer of the x-ray images, such as on a high-resolution display screen. FIG. 10C shows the successful detection of ET tubing for this example. The section of ET tubing for this patient, detected following the classification of false positives in steps just described, appears to have suitable condition, thickness, curvature, and other features. Highlighting of the detected tubing can be performed in a display highlighting step S180. As part of this step, color can be used to outline or otherwise highlight the display of tubing obtained using the steps shown in FIG. 1.

The method of the present invention has been shown to yield favorable results for tube and tip detection over other methods. Improved tubing discrimination with this method also results in a reduced number of false-positive readings. With one sample set of test images, quadratic discriminant analysis for false positive detection, applied using the general sequence described, obtained a reduction in the number of false-positives without measurable sensitivity loss. Results showed a sensitivity of 92% at 1.5. FPs/image. Earlier methods had achieved approximately 80% sensitivity at the same relative number of false positive per image.

As noted above, the rotating bands method of image processing that is used in the present invention can also be used for detecting the ROI in ROI detection step S130.

Figure 11:
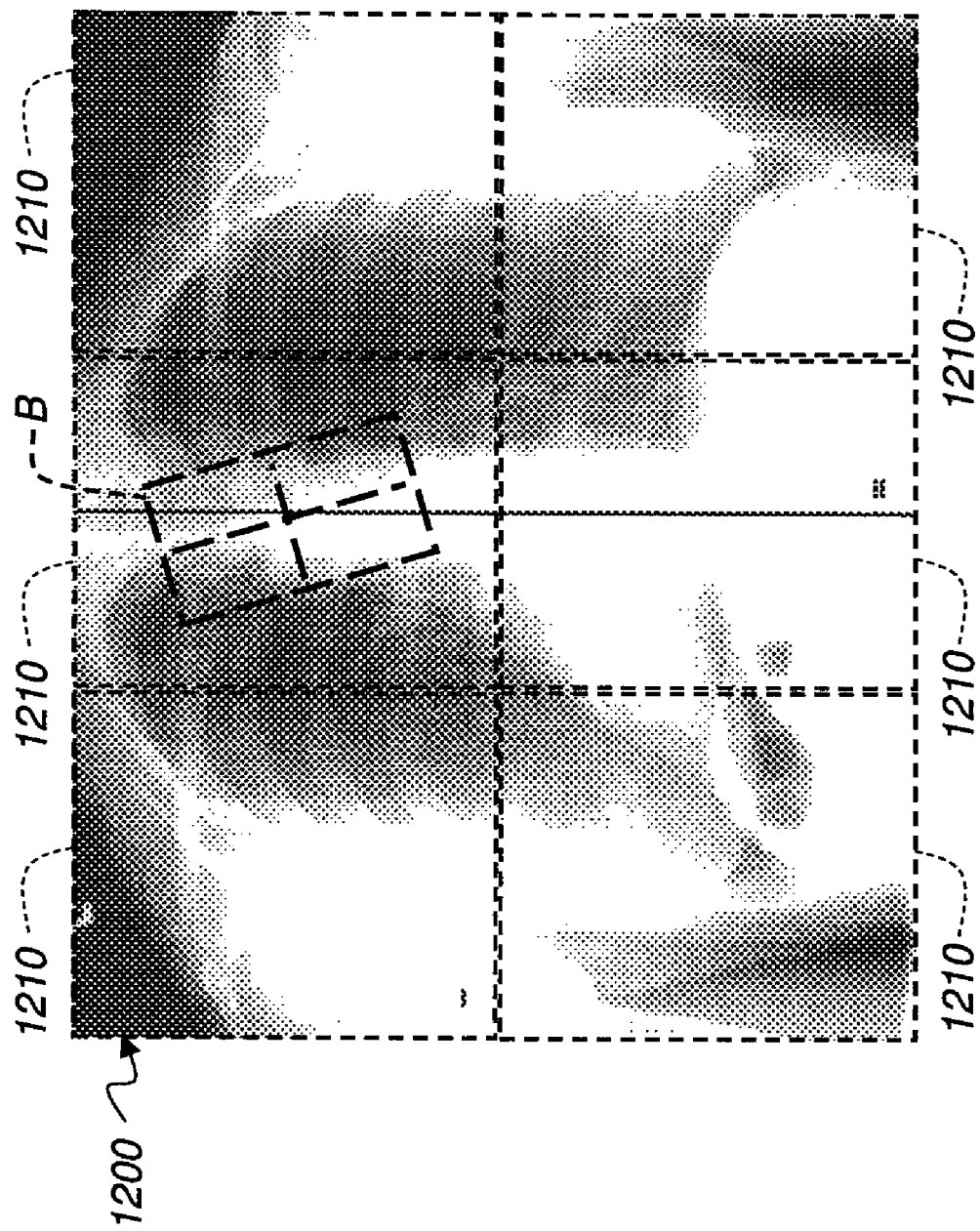
FIG. 11 is a plan view showing processing of an image, in successive portions, in order to identify a region of interest in another embodiment of the present invention.

Referring to FIG. 11, there is shown a plan view of an image 1200, processed in successive portions 1210 in order to identify a region of interest in an embodiment of the present invention. For this function, image 1200 is divided into two or more portions 1210, so that each portion 1210 can be separately analyzed for detection of a linear feature, such as a skeletal structure or other structure, for example. For any portion 1210, its "neighboring" portions are those to its immediate right or left, diagonal, or immediately above or below. Each portion 1210 is processed to form a gradient magnitude image. Then, within each portion 1210, rotating band B is used, oriented to one of a number of discrete positions, for detection of linear features using the same overall analysis of data described earlier with particular reference to FIGS. 5A and 5B. As part of this processing, the ensemble average of gradient magnitude values along a plurality of lines within rotated band B is obtained and the relative magnitudes computed, in order to identify and evaluate one or more linear features within the portion. Results of identified linear features from each portion are compared against results from neighboring portions in order to locate the region of interest.

In the particular example of FIG. 11, the location of a predominant linear feature, in this case, the spine of the patient, can be determined from the results of rotating band processing of the middle portions in the top and bottom row arrangement shown. It is noted that portions 1210 could have any suitable arrangement, that this processing may segment the image into two or more portions in any number of ways, and that these portions may or may not be spatially overlapping. As shown in the example of FIG. 11, a linear feature (the spine in this example) may span two or more neighboring portions 1210, so that the ROI is the union of two or more neighboring portions 1210. This method can be further enhanced by subsequent processing that shifts the locations of portions 1210 or changes their size or distribution in some other way, which may be useful for iterative processing where linear structures are more difficult to detect.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, as noted earlier, any of a number of different methods could be used for ROI detection, including the use of earlier tube detection results for the same patient, for example. A single edge image could be obtained and analyzed and used for storing both left- and right-edge content.

Thus, what is provided is a method for enhancing diagnostic images in order to detect the position of tubes positioned within the patient.

PARTS LIST

30. ROI
40. Enhanced tube pattern feature template-processed image
42. Tube segment
44, 46, 48, 50. Tubing growth
60r, 60l. Gradient image
100. Detection method
210. Graph
212, 214. Point
1200. Image
1210. Portion
1302. Image
1304. ROI
1304'. Gradient magnitude image
1504. Image
S110. Obtain image step
S120. Image processing step
S130. ROI detection step
S140. Detect possible tube segments step
S141. Gradient image generation step
S142. Rotatable band definition step
S143. Enhanced tube pattern feature template processing step
S144. Gradient feature template processing step
S145. Thresholding step
S150. Candidate detection step
S155. Feature mask generation step
S156. Region labeling and selection step
S158. Storage step
S160. Tube enhancement and merging step
S161. Initialization step
S162. Fitting step
S164. Extension step
S166. Test step
S168. Termination step
S170. False positive removal step
S180. Display highlighting step
B. Rotatableband
FP1, FP2, FP3, FP4, FP5. False positives

The invention claimed is:

1. A method for detecting tubing in a radiographic image of a patient, comprising:
   obtaining radiographic image data for a patient;
   identifying a region of interest in the radiographic image;
   forming a gradient magnitude image of the region of interest;
   analyzing the gradient magnitude image to identify one or more linear features by defining a band lying substantially within the region of interest and having a center point and repeating a sequence comprising two or more iterations of:
   (i) assigning a rotation angle for the rotatable band about the center point; and
   (ii) computing the ensemble average of gradient magnitude values along each of a plurality of lines extending within the rotatable band at the defined rotation angle and computing relative magnitudes for the lines; and
   evaluating the one or more identified linear features according to the results of the ensemble average computing.

2. The method of claim 1 further comprising computing a ratio of magnitudes for one or more lines within a rotatable band.

3. The method of claim 1 further comprising analyzing the one or more identified linear features to remove one or more false-positive tubing candidates.

4. The method of claim 3 wherein analyzing the one or more identified linear features to remove one or more false-positive tubing candidates comprises analyzing one or more of curvature, length, position relative to patient anatomy, detected tip position, and tube width standard deviation using quadratic discriminant analysis.

5. The method of claim 1 further comprising combining two or more identified linear features to form a tube segment.

6. The method of claim 5 further comprising extending the tube segment by:
   using first-order or third-order polynomial curve fitting of the at least one detected tube segment; and
   iteratively extending from one or both ends of the tube segment by identifying a group of consecutive pixels along a fitted curve.

7. The method of claim 6 further comprising displaying the identified tube segment.

8. The method of claim 7 wherein displaying the identified tube segment comprises highlighting the identified tube segment on a display screen.

9. The method of claim 5 wherein combining two or more identified linear features is done according to the distance between them.

10. The method of claim 1 further comprising performing contrast enhancement on the radiographic image.

11. The method of claim 1 wherein identifying a region of interest in the radiographic image further comprises:
   identifying one or more linear features in each of a plurality of portions of the image in a sequence that comprises, for each portion:
   forming a gradient magnitude image within the portion of the image;
   analyzing the gradient magnitude image to identify one or more linear features by defining a band lying substantially within the portion of the image and having a center point and repeating a sequence comprising two or more iterations of:
   (i) assigning a rotation angle for the rotatable band; and
   (ii) computing the ensemble average of gradient magnitude values along each of a plurality of lines extending within the rotatable band at the defined rotation angle and computing relative magnitudes for the lines;
   evaluating the one or more identified linear features within the portion; and
   comparing the identified linear features from neighboring individual portions to identify the region of interest.

12. A method for identifying a region of interest in a radiographic image comprising:
   identifying one or more linear features in each of a plurality of portions of the image in a sequence that comprises, for each portion;
   forming a gradient magnitude image within the portion of the image;
   analyzing the gradient magnitude image to identify one or more linear features by defining a band lying substantially within the portion of the image and having a center point and repeating a sequence comprising two or more iterations of:
   (i) assigning a rotation angle for the rotatable band; and
   (ii) computing the ensemble average of gradient magnitude values along each of a plurality of lines extending within the rotatable band at the defined rotation angle and computing relative magnitudes for the lines to detect the one or more identified linear features within the portion; and
   comparing the identified linear features from neighboring individual portions to identify the region of interest.

\* \* \* \* \*